United States Patent [19]

Pniel

[11] Patent Number: 5,786,932
[45] Date of Patent: Jul. 28, 1998

[54] VISION ASSISTING APPARATUS

[75] Inventor: Zeev Pniel, Petach Tikva, Israel

[73] Assignee: International Technologies (Lasers), Ltd., Rishon Lezion, Israel

[21] Appl. No.: 358,387

[22] Filed: Dec. 19, 1994

[30] Foreign Application Priority Data

Dec. 19, 1993 [IL] Israel .............................. 108081

[51] Int. Cl.⁶ .................. G02B 23/00; G02B 27/14; G02B 7/02
[52] U.S. Cl. .................. 359/409; 359/410; 359/411; 359/415; 359/407; 359/632; 359/815; 359/816; 359/630; 250/214 VT; 250/213 VT
[58] Field of Search ............... 359/409, 410, 359/411, 412, 413, 417, 418, 414, 416, 429, 379, 383, 407, 632, 815, 816, 630, 631; 250/214 VT, 213 VT

[56] References Cited

U.S. PATENT DOCUMENTS

| | | | |
|---|---|---|---|
| 2,531,585 | 11/1950 | Pope | 359/802 |
| 4,672,194 | 6/1987 | Kastendieck et al. | 250/214 VT |
| 4,886,340 | 12/1989 | Kanda | 359/411 |
| 4,968,123 | 11/1990 | Fournier, Jr. et al. | 350/538 |
| 5,000,544 | 3/1991 | Staveley | 350/174 |
| 5,128,807 | 7/1992 | Blackman | 359/816 |
| 5,179,735 | 1/1993 | Thomanek | 359/409 |
| 5,331,459 | 7/1994 | Dor | 359/409 |
| 5,331,684 | 7/1994 | Baril et al. | 359/409 |

FOREIGN PATENT DOCUMENTS 77754  2/1989  Israel.

Primary Examiner—Thong Nguyen
Assistant Examiner—Mohammad Y. Sikder
Attorney, Agent, or Firm—Fliester, Dubb, Meyer & Lovejoy

[57] ABSTRACT

A single eye vision device includes a head mount, a vision assist assembly mounted on the head mount for selectable positioning in front of an eye of a wearer and single lever operated positioning apparatus for positioning of the vision assist assembly on the head mount.

6 Claims, 12 Drawing Sheets

VISION ASSISTING APPARATUS

FIELD OF THE INVENTION

The present invention relates to vision assisting apparatus and more particularly to night vision apparatus.

BACKGROUND OF THE INVENTION

Various types of night vision apparatus are known in the art, including head mounted apparatus. There is described in applicant/assignee's Israel Patent 77754, a head-mounted single eye night vision device which can be used by either eye, while leaving the other eye unobstructed for normal vision.

SUMMARY OF THE INVENTION

The present invention seeks to provide an improved head-mounted single eye vision assist device which is more convenient to use than prior art devices.

There is thus provided in accordance with a preferred embodiment of the present invention a single eye vision assist device including a head mount, a vision assist assembly mounted on the head mount for selectable positioning in front of an eye of a wearer for aided viewing, or out of the line of sight for unaided viewing and single hand, single lever, operated positioning apparatus for positioning of the vision assist assembly on the head mount.

In accordance with a preferred embodiment of the invention, where the vision assist assembly is battery operated, an automatic cut-off switch is associated with the single hand operated positioning apparatus for de-energizing the vision assist assembly when it is not positioned in front of the eye of a wearer.

Preferably, the single hand, single lever, operated positioning apparatus has two degrees of freedom. The two degrees of freedom are preferably rotation about an axis generally perpendicular to the face of the wearer and linear translation along that axis.

In accordance with a preferred embodiment of the invention, the vision assist assembly comprises night vision apparatus such as an image intensifier. Alternatively, the vision assist assembly may comprise a telescope or other optical device.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
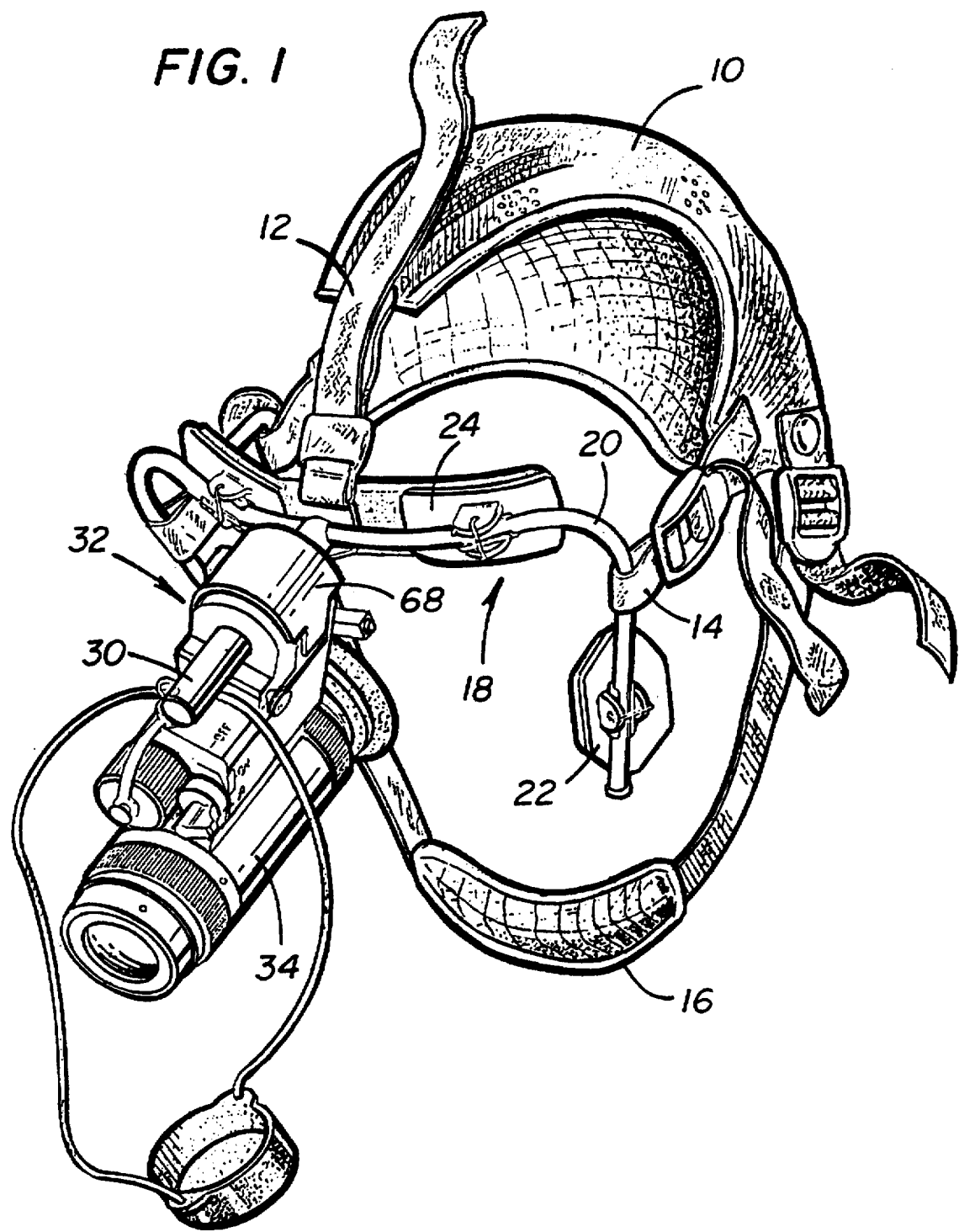
FIG. 1 is a pictorial illustration of head-mounted, single eye vision assist apparatus constructed and operative in accordance with a preferred embodiment of the present invention.

Reference is now made to FIGS. 1–9, which illustrate single eye vision assist apparatus constructed and operative in accordance with a preferred embodiment of the present invention. The apparatus comprises a net portion 10 onto which are mounted a forehead strap 12, and a pair of face straps 14 as well as a chin pad and strap assembly 16. Supported onto forehead strap 12 and face straps 14 is a vision assist assembly mounting chassis 18.

Chassis 18 comprises a rod 20 which is typically bent as illustrated and is associated with a pair of cheek pads 22 and forehead pads 24. Preferably fixedly mounted at the center of rod 20 and extending generally perpendicularly to the face of the wearer is a mounting shaft 30. A single hand operable positioning device 32 is rotatably and slidably mounted onto mounting shaft 30 and supports a vision assist assembly 34, such as a night vision device. Alternatively assembly 34 may comprise any other suitable vision assist assembly, for example a passive device such as a telescope.

Figure 2:
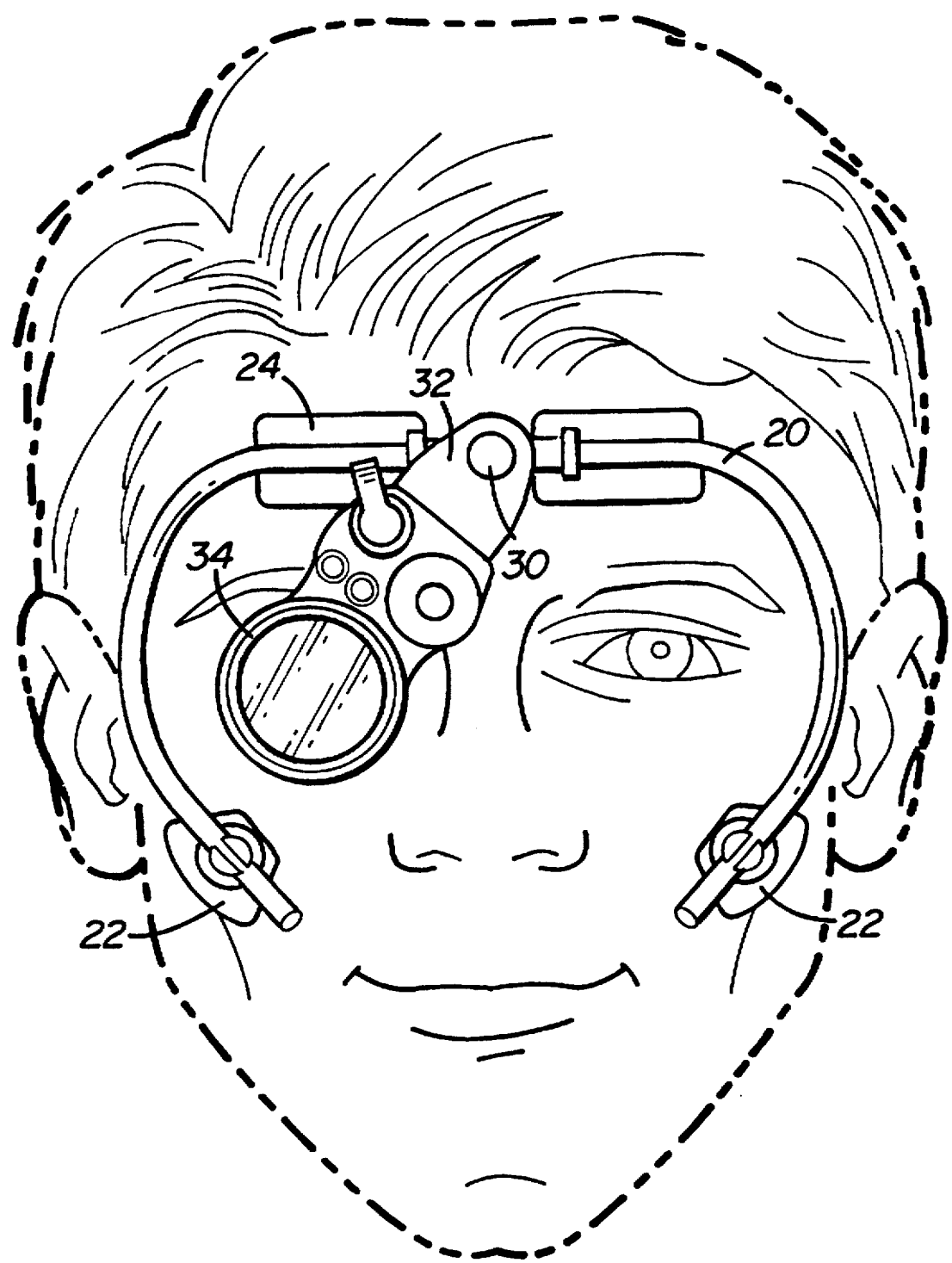
FIG. 2 is a pictorial illustration of the apparatus of FIG. 1 mounted on the head of a wearer with the vision assist assembly located in operative engagement with one eye of a wearer.
Figure 3:
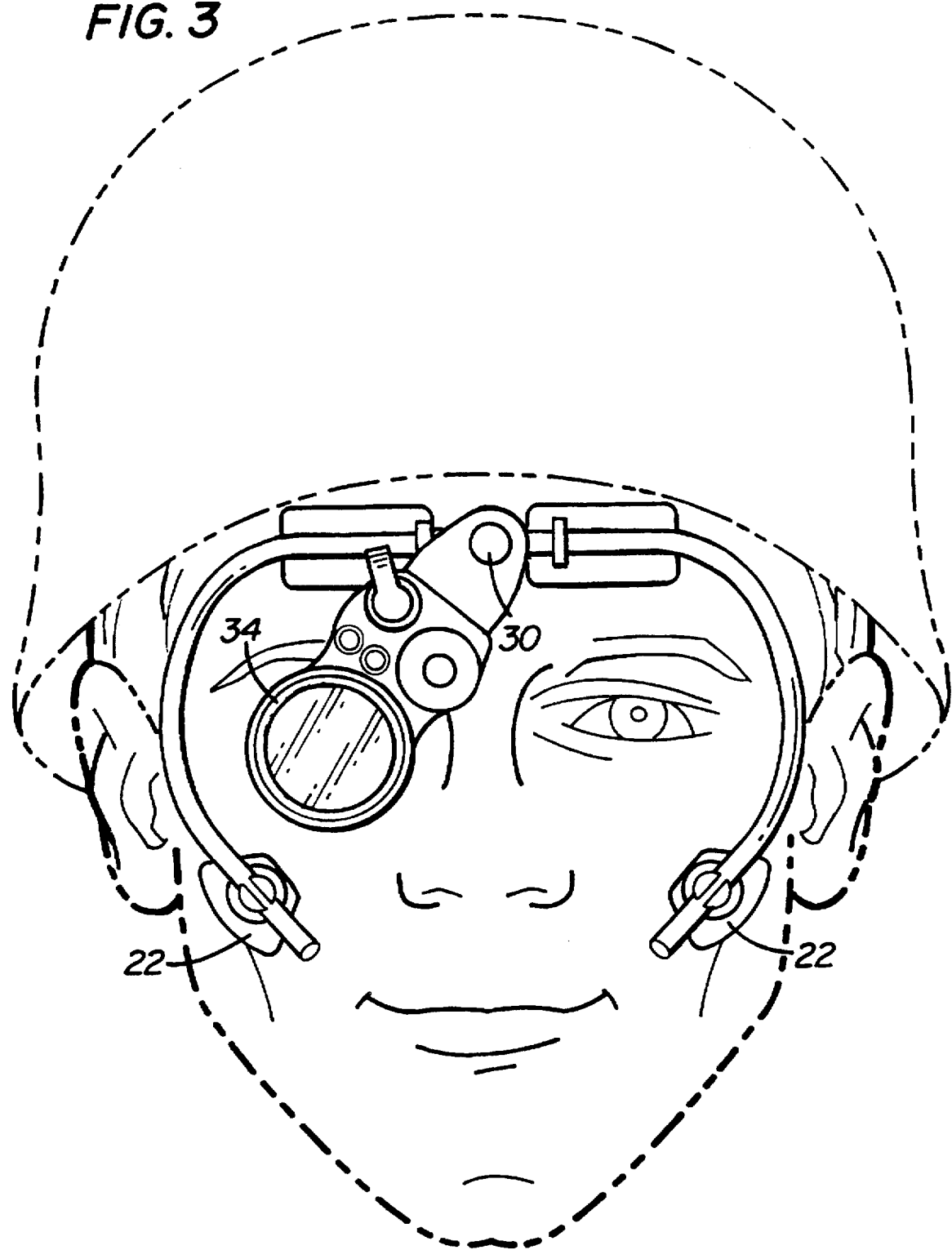
FIG. 3 is a pictorial illustration of the apparatus of FIG. 1 mounted on the head of a wearer with the vision assist assembly located in operative engagement with one eye of the wearer when the wearer is wearing a helmet over the apparatus.
Figure 4:
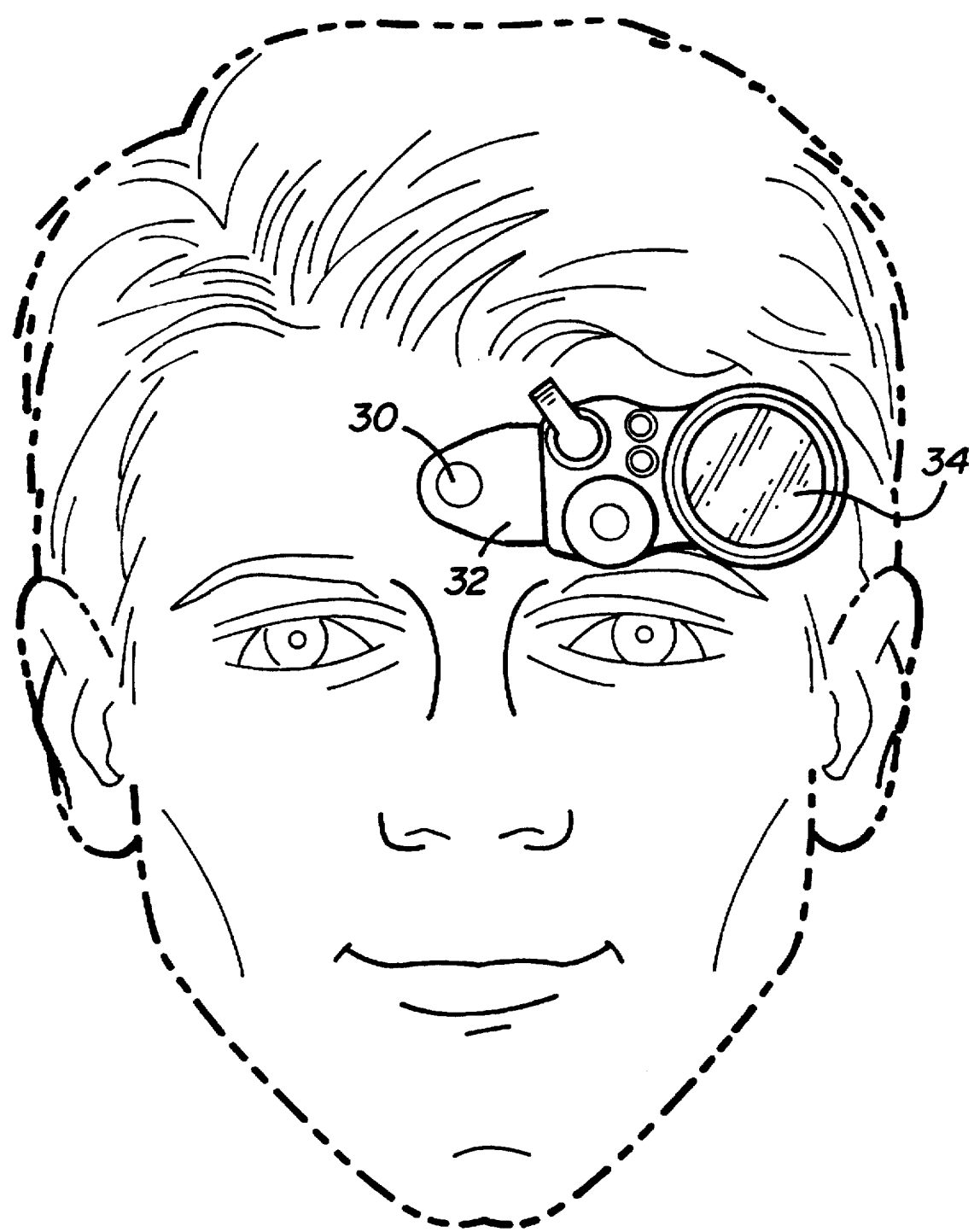
FIG. 4 is a pictorial illustration of the apparatus of FIG. 1 mounted on the head of a wearer with the vision assist assembly located out of operative engagement with an eye of the wearer.
Figure 5:
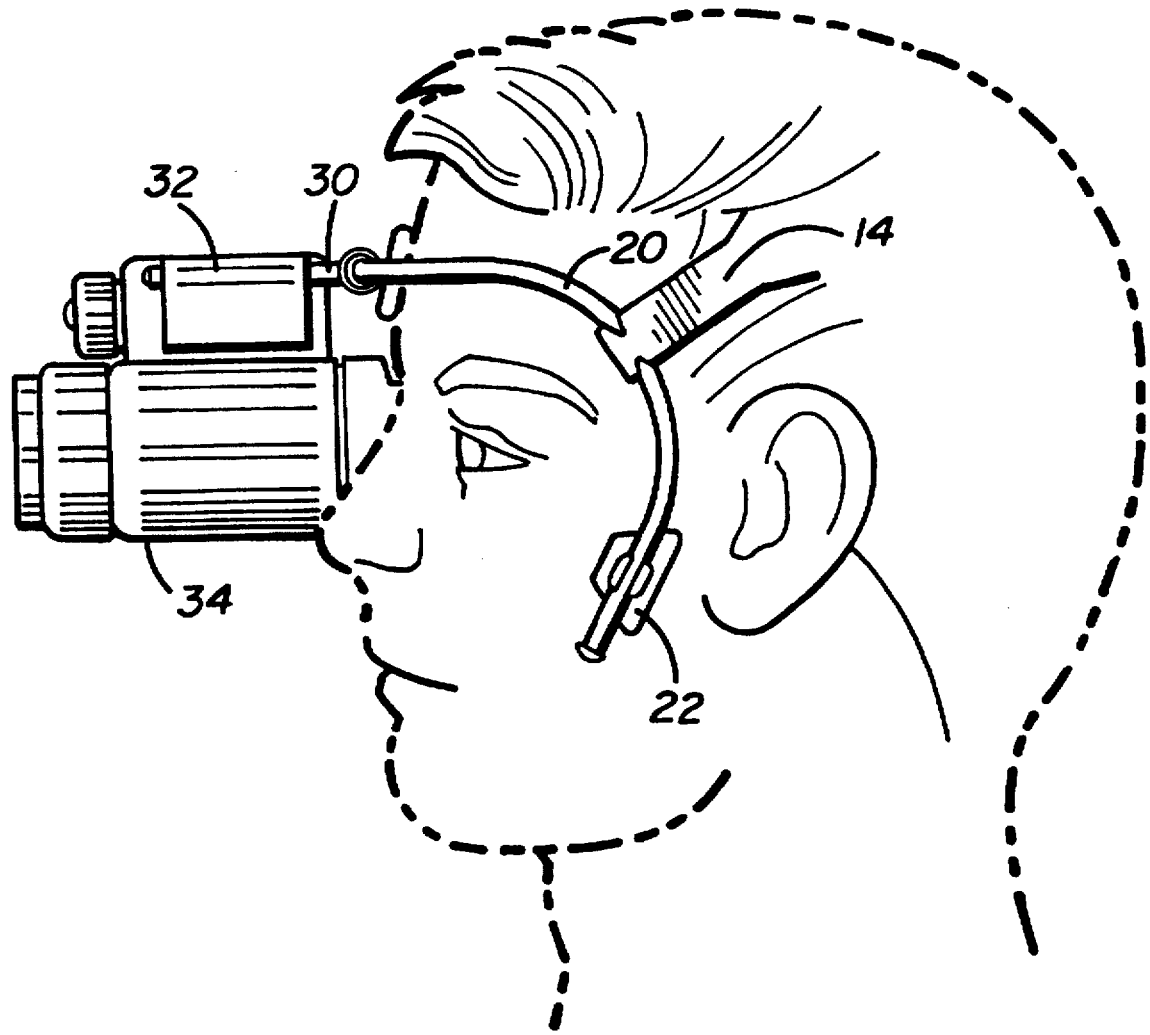
FIG. 5 is a side view illustration corresponding to the view of FIG. 2.
Figure 7:
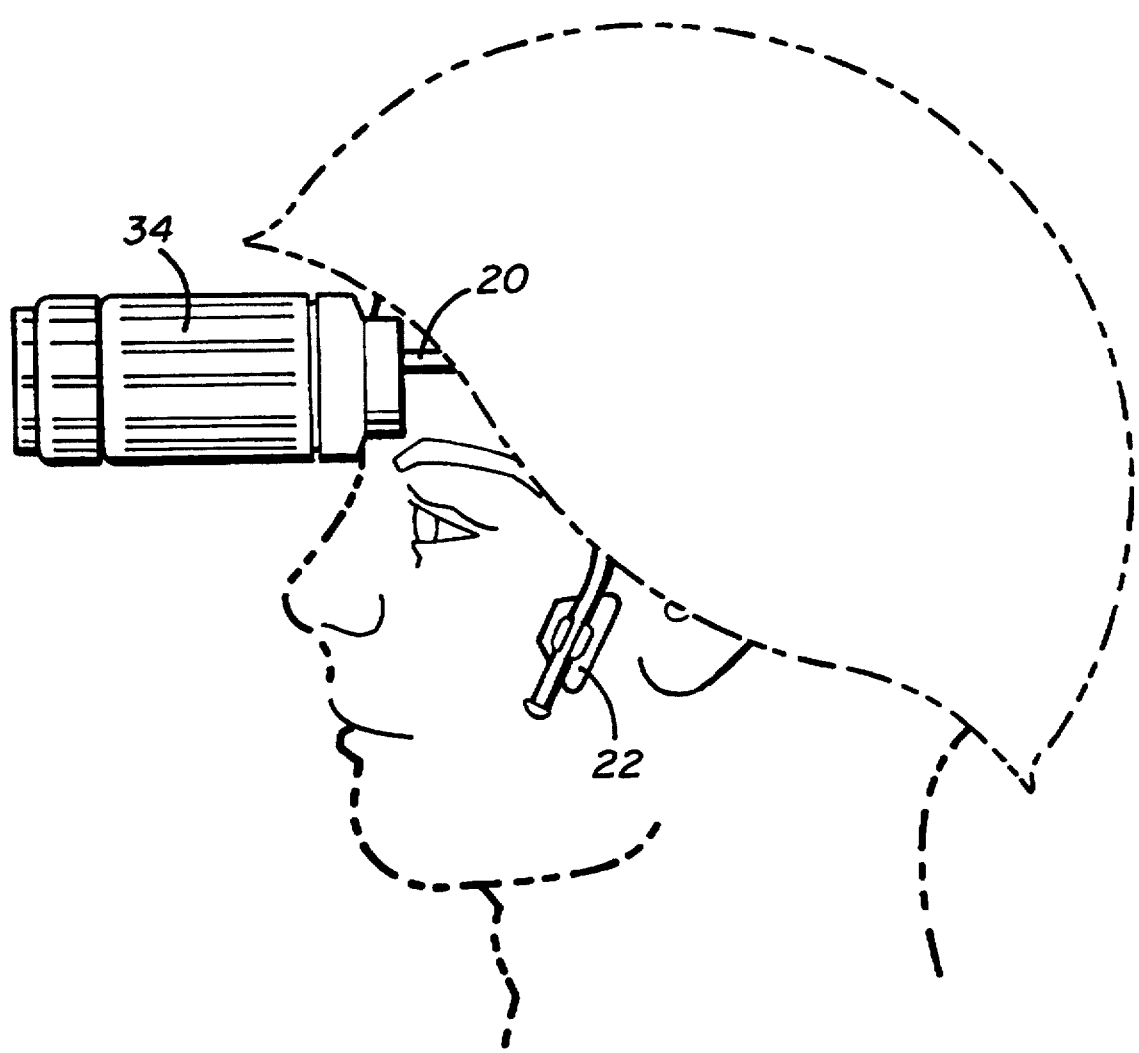
FIG. 7 is a side view illustration corresponding to the view of FIG. 4, when the wearer is wearing a helemt over the apparatus.

It is a particular feature of the present invention that positioning assembly 32 enables the vision assist assembly 34 to quickly and easily be moved into and out of operative engagement with the eye of a wearer. FIGS. 2 and 5 illustrate the assembly 34 in operative engagement with the right eye of the wearer. FIGS. 3 and 7 illustrate the fact that the apparatus of the invention does not interfere with and is not interfered with by the wearing of a conventional battle helmet. FIG. 4 shows the assembly 34 rotated to a position above the left eye of the wearer and out of operative engagement with the wearer's eyes.

Figure 6:
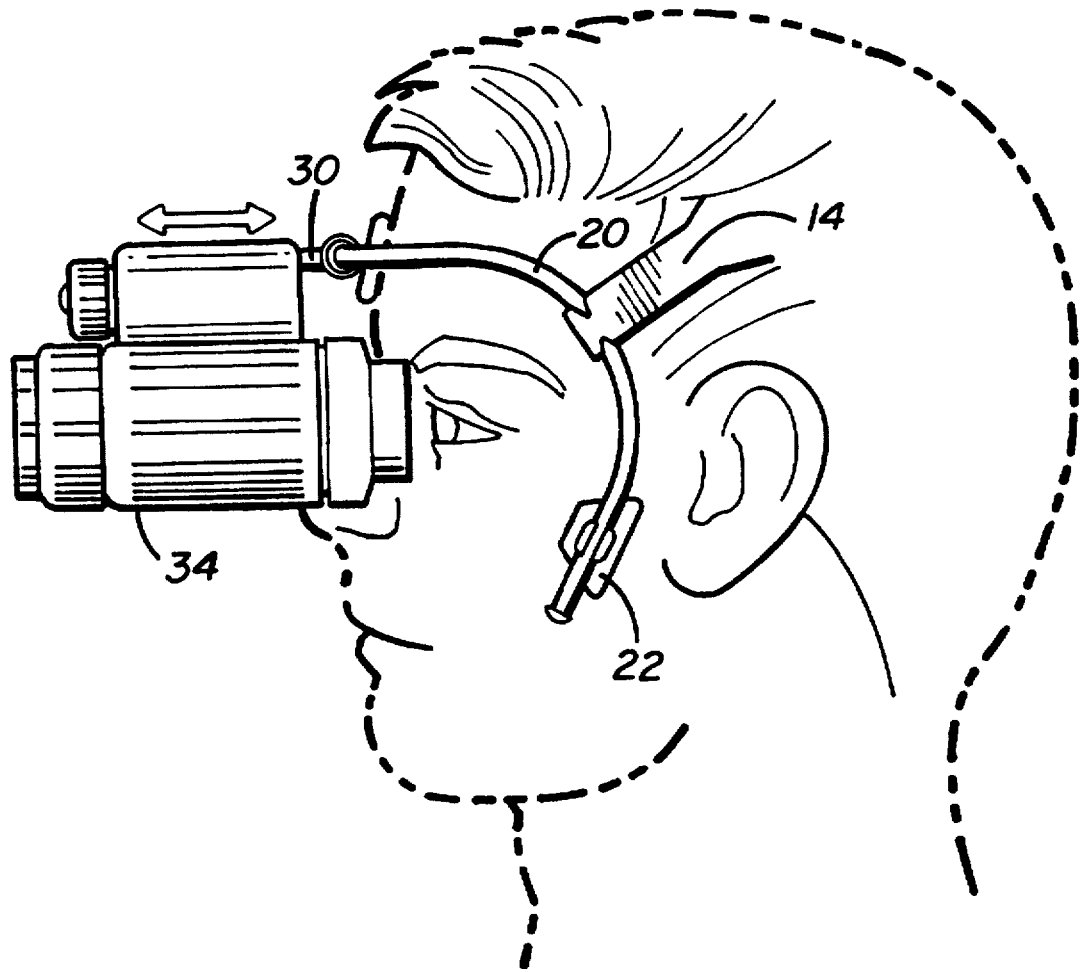
FIG. 6 is a side view illustration corresponding to the view of FIG. 5, but showing the vision assist assembly in operative association with the opposite eye.

FIG. 6 illustrates the assembly 34 rotated to a position in operative engagement with the left eye of the wearer, while FIG. 7 illustrates the assembly 34 rotated to a position above the left eye of the wearer and out of operative engagement with the wearer's eyes. By sliding assembly 34 in a desired position along the shaft 30, the eye relief distance may be set for most comfortable viewing. Thus, apparatus 34 has two degrees of freedom with respect to shaft 30, permitting axial sliding of apparatus 34 in the direction of the arrow shown in FIG. 6 and rotation of apparatus 34 about shaft 30 from the position shown in FIG. 6 to the position shown in FIG. 7.

Figure 8:
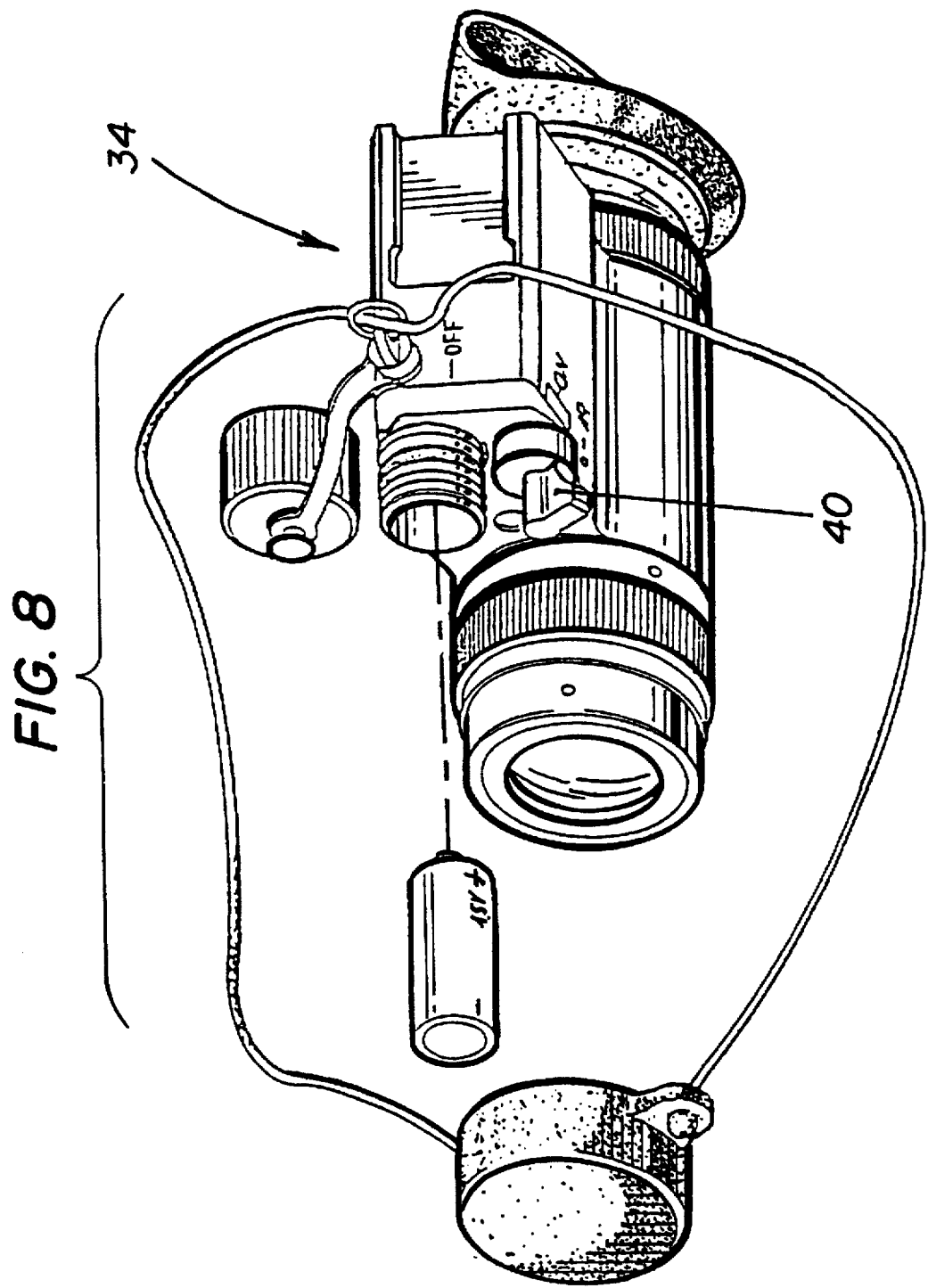
FIGS. 8 and 9 are pictorial illustrations of a preferred embodiment of a vision assist device forming part of the apparatus of FIG. 1.
Figure 9:
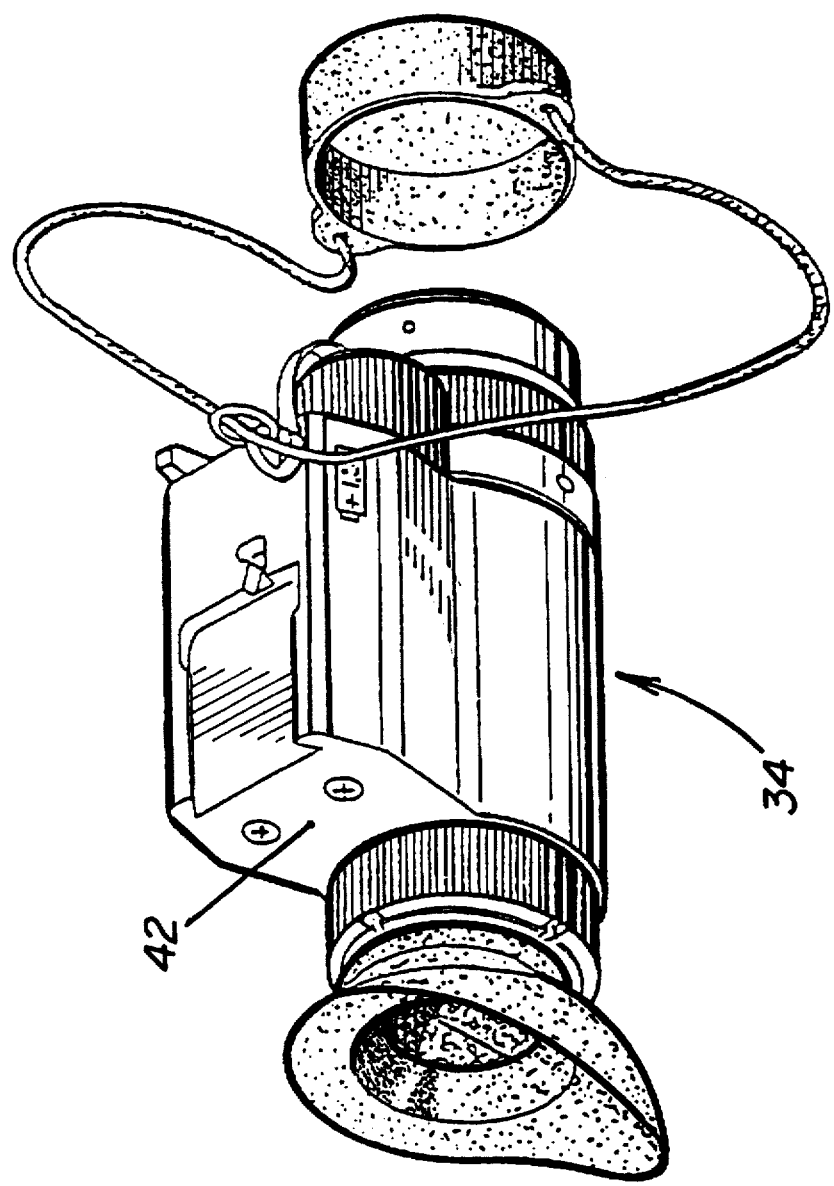

Reference is now made to FIGS. 8 and 9 which illustrate a preferred embodiment of night vision apparatus useful as assembly 34 in the apparatus of FIGS. 1–7. The apparatus of FIGS. 8 and 9 preferably comprises a Mini N/SEAS image intensifier scope having a manually actuable ON/OFF switch 40 and preferably also including a magnetic ON/OFF switch 42.

Figure 10:
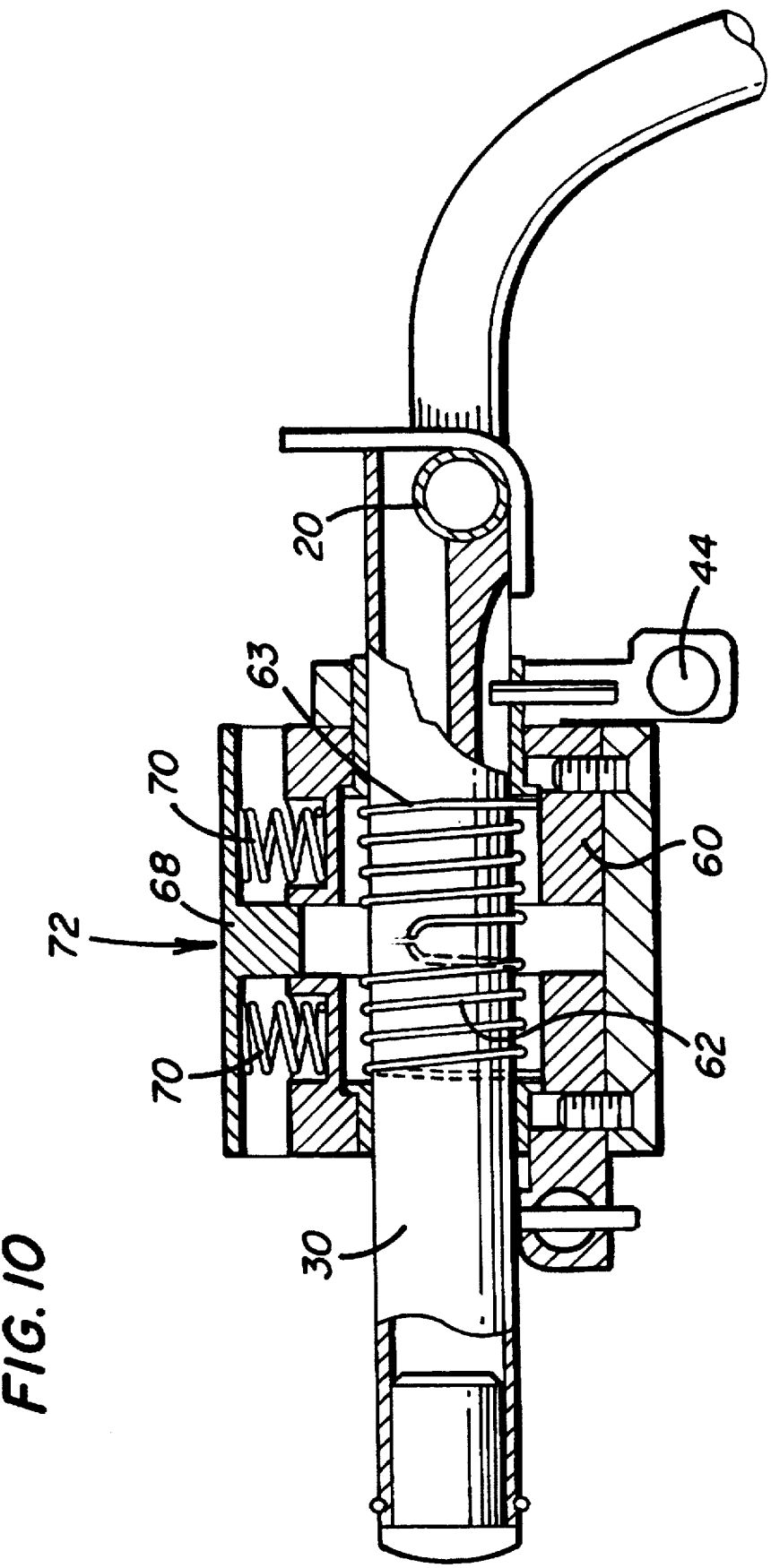
FIG. 10 is a sectional illustration of single hand operated positioning apparatus forming part of the apparatus of FIG. 1.

Switch 42 is operated by proximity thereto of a magnet 44 (FIG. 10) mounted on positioning apparatus 32 and is calibrated such that it automatically switches off the night vision apparatus when the assembly 34 is not rotationally positioned in operative engagement with one of the wearer's eyes.

Figure 11A:
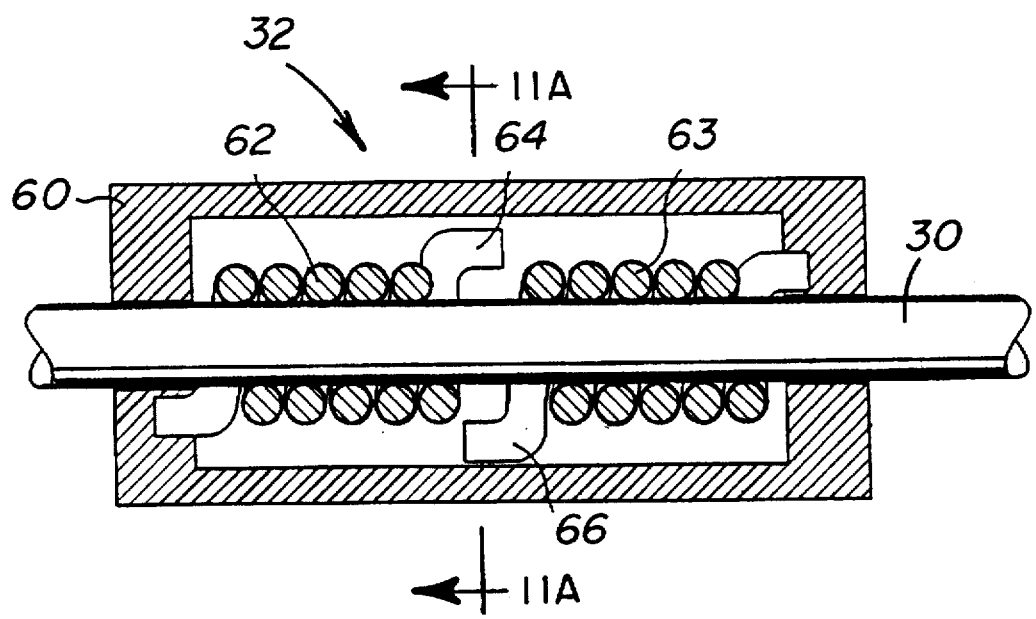
FIGS. 11A and 11B are illustrations of part of the positioning apparatus of FIG. 10 in respective engaged and disengaged orientations.
Figure 11B:
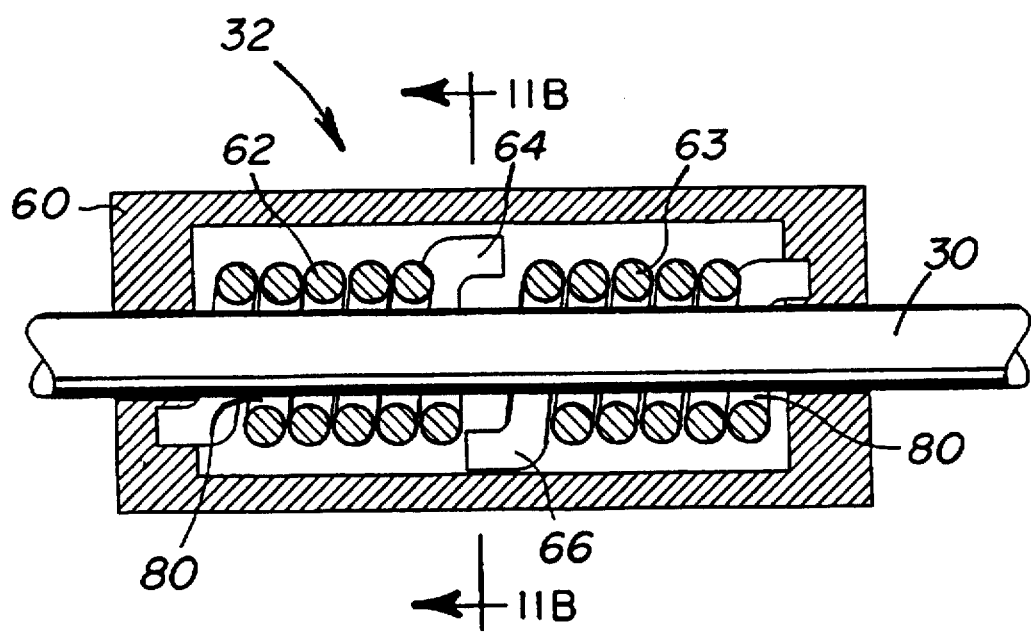
Figure 12A:
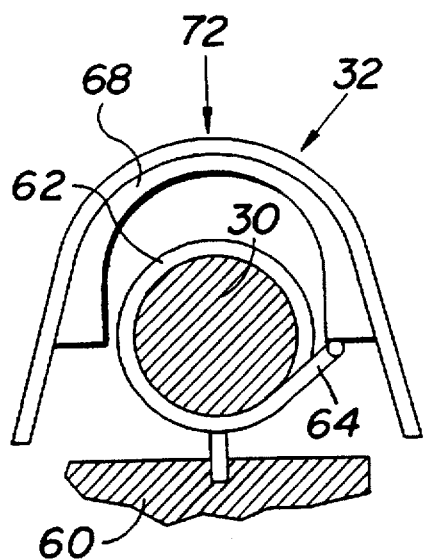
FIGS. 12A and 12B are sectional illustrations taken along lines A—A of FIG. 11A, where FIG. 12A looks in the direction for which the spring is wound in a counterclockwise direction and FIG. 12B looks in the direction for which the spring is wound in a clockwise direction.
Figure 12B:
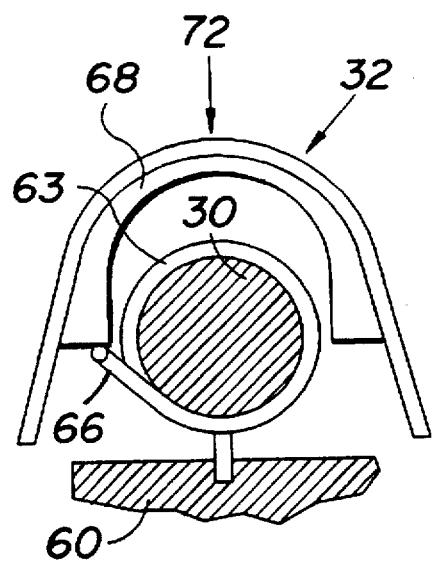

Reference is now made to FIGS. 10, 11A, 11B, 12A, 12B 12C and 12D, which illustrate the construction and operation of a preferred embodiment of positioning apparatus 32. In accordance with a preferred embodiment of the present invention, apparatus 32 comprises a housing 60 which surrounds part of shaft 30 and encloses a pair of locking springs 62 and 63, which are normally in tight, locking engagement with shaft 30, as illustrated in FIGS. 11A, 12A and 12B. Preferably, springs 62 and 63 are mutually oppositely actuated about shaft 30, so that spring 62 locks the shaft 30 in the clockwise direction and spring 63 locks the shaft 30 in the counter-clockwise direction.

One and of each locking spring is fixed with respect to housing 60, while the other end of each locking spring, indicated by reference numerals 64 and 66, is selectably displaceable by means of a single hand operated lever 68, which is normally maintained out of displacing engagement therewith, by means of springs 70, such that normally the housing is locked into position onto shaft 30. Vision assist assembly 34 is preferably slidably and removably mounted onto housing 60 and thus is normally fixed to shaft 30.

Figure 12C:
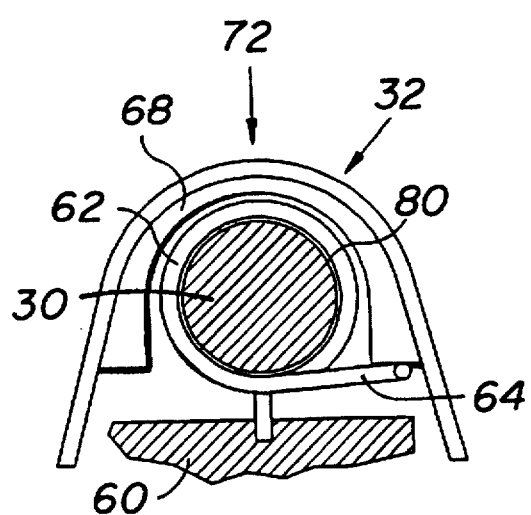
FIGS. 12C and 12D are sectional illustrations taken along lines B—B of FIG. 11B, where FIG. 12C looks in the direction for which the spring is wound in a counterclockwise direction and FIG. 12D looks in the direction for which the spring is wound in a clockwise direction.
Figure 12D:
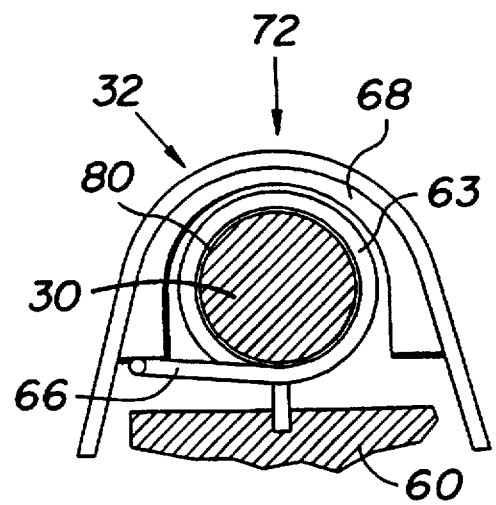

Depression of lever 68 in a direction indicated by reference numeral 72 causes ends 64 and 66 of respective springs 62 and 63 to be displaced such as to loosen the grip of springs 62 and 64 on shaft 30, as can be seen clearly by comparing FIGS. 11A, 12A and 12B with FIGS. 11B, 12C and 12D. As seen, by comparing FIG. 11A with FIG. 11B, depressing lever 68 lifts the springs 62 and 64 away from shaft 30 and producing the spacing 80 (FIG. 11A). This enables the wearer, using the same hand that is used to depress the lever 68 to rotate housing 60 and assembly 34 about shaft 30 and to slide housing 60 and assembly 34 to a desired position along shaft 30, all in a quick continuous movement.

Instead of coil springs it is possible to employ equivalent components such as longitudinally slit generally circular cylindrical elastic sleeves which normally tightly engage shaft 30 and which may be momentarily spread apart at the longitudinal slit to permit rotational and longitudinal displacement of the sleeve relative to the shaft.

It will be appreciated by persons skilled in the art that the present invention is not limited by what has been particularly shown and described hereinabove. Rather the scope of the present invention is defined only by the claims which follow:

I claim:

1. A single eye vision assist device including a head mount, a vision assist assembly mounted on the head mount for selectable positioning in front of an eye of a wearer and a positioning apparatus for positioning of the vision assist assembly on the head mount, said positioning apparatus capable of axial movement along an axis generally perpendicular to the face of a wearer and rotational movement about said axis into and out of a position in front of the eye of the wearer.

2. A device according to claim 1 and wherein the vision assist assembly is battery operated, and also comprising an automatic cut-off switch is associated with positioning apparatus for de-energizing the vision assist assembly when it is not positioned in front of the eye of the wearer.

3. A device according to claim 1 and wherein said vision assist assembly comprises a night vision device.

4. A device according to claim 1 and wherein said vision assist assembly comprises a passive optical device.

5. A device according to claim 1 and wherein said positioning apparatus comprises first and second mutually oppositely actuated springs which are disposed in selectable coaxial locking engagement with a mounting shaft and a lever for selectably displacing at least part of said first and second mutually oppositely actuated springs for selectably releasing said first and second mutually oppositely actuated springs from said coaxial locking engagement.

6. A device according to claim 1 and wherein said positioning apparatus is single lever operated positioning apparatus for positioning of the vision assist assembly on the head mount by a single lever.

\* \* \* \* \*